United States Patent
De Jong

(10) Patent No.: US 7,186,783 B2
(45) Date of Patent: Mar. 6, 2007

(54) PROCESS FOR PREPARAING PARTIALLY HYDROGENATED BUTADIENE POLYMERS

(75) Inventor: Wouter De Jong, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 199 days.

(21) Appl. No.: 10/110,921

(22) PCT Filed: Jul. 25, 2001

(86) PCT No.: PCT/EP01/08607

§ 371 (c)(1),
(2), (4) Date: Aug. 14, 2002

(87) PCT Pub. No.: WO02/34799

PCT Pub. Date: May 2, 2002

(65) Prior Publication Data

US 2003/0092851 A1 May 15, 2003

(30) Foreign Application Priority Data

Jul. 28, 2000 (EP) .................................. 00306435

(51) Int. Cl.
*C08F 8/04* (2006.01)
(52) U.S. Cl. ................ 525/339; 525/331.9; 525/332.9; 525/940
(58) Field of Classification Search ................ 525/339, 525/331.9, 333.2, 314, 940, 332.9
See application file for complete search history.

(56) References Cited

U.S. PATENT DOCUMENTS

| | | | |
|---|---|---|---|
| 3,663,635 A | | 5/1972 | Lassau et al. |
| 3,700,748 A | * | 10/1972 | Winkler ...................... 525/314 |
| 4,501,857 A | | 2/1985 | Kishimoto et al. |
| 4,673,714 A | * | 6/1987 | Kishimoto et al. .......... 525/314 |
| 5,017,660 A | * | 5/1991 | Hattori et al. ............... 525/338 |
| 5,039,755 A | * | 8/1991 | Chamberlain et al. ...... 525/338 |
| 5,132,372 A | | 7/1992 | Chamberlain et al. |
| 5,242,986 A | * | 9/1993 | Gibler et al. ............. 525/332.8 |
| 5,925,717 A | * | 7/1999 | De Boer et al. ............. 525/338 |
| 5,945,485 A | | 8/1999 | Struglinski et al. |
| 6,461,993 B1 | * | 10/2002 | Van Der Heijden et al. ........................... 502/104 |

FOREIGN PATENT DOCUMENTS

| | | |
|---|---|---|
| DE | 3401983 | 8/1984 |
| EP | 0 302 505 A2 | 2/1989 |
| EP | 0 339 986 | 11/1989 |
| EP | 0 434 469 | 6/1991 |
| EP | 0 544 304 | 6/1993 |
| EP | 0 545 844 | 6/1993 |
| EP | 0 584 860 | 3/1994 |
| EP | 0 795 564 A1 | 9/1997 |
| EP | 0 810 213 | 12/1997 |
| EP | 0 810 231 | 12/1997 |
| EP | 0 830 895 | 3/1998 |
| JP | 2 214418 | 8/1990 |
| JP | 4 096904 | 3/1992 |
| JP | 97 291121 | 4/1996 |
| JP | 08-106490 | 11/1997 |
| WO | WO 95/25130 | 9/1995 |
| WO | WO 00/25915 A2 | 5/2000 |

OTHER PUBLICATIONS

Patent Abstracts of Japan: Pub. No. 08-106940; publication date: Apr. 23, 1996.*
English language translation of JP 9-291121-A, published Nov. 1997.*

* cited by examiner

*Primary Examiner*—Fred Teskin
(74) *Attorney, Agent, or Firm*—Keith M. Tackett; Michael A. Masse

(57) ABSTRACT

The present invention relates to a process for preparing a partially hydrogenated butadiene polymer comprising no more than 3 mol % 1,2-butadiene-recurring units (A) and no more than 3 mol % ethylene recurring units (D), calculated on the total content mol/mol of recurring units, wherein a butadiene polymer comprising 1,2-butadiene recurring units (A) and 1,4-butadiene recurring units (B) is hydrogenated in the presence of hydrogen and a titanium-, zirconium- and/or hafnium-based metallocene compound as hydrogenation catalyst and a cocatalyst, characterized in that:
  a) the hydrogenation catalyst has a reaction rate ratio of r1/r2 greater than 5, wherein r1 and r2 are the hydrogenation rates of recurring units (A) and (B) respectively at the same reaction conditions,
  b) the cocatalyst is an alkali metal hydride, added as such or prepared in situ, and
  c) hydrogenation of the conjugated diene is carried out until at least 97% of recurring units (A) have been hydrogenated.

9 Claims, No Drawings

PROCESS FOR PREPARAING PARTIALLY HYDROGENATED BUTADIENE POLYMERS

FIELD OF THE INVENTION

The present invention relates to a process for preparing partially hydrogenated butadiene polymers.

BACKGROUND OF THE INVENTION

It is known that conjugated diene polymers comprise a mixture of recurring units of structures that in the art are referred to as (cis or trans) 1,4-structures and 1,2-structures. The 1,4-structure results in unsaturation in the polymer backbone, the 1,2-structure results in the attachment of unsaturated groups (vinyl groups) to the backbone. Conjugated diene polymers with selectively hydrogenated 1,2-butadiene (butylene) units have been found to have a number of desirable properties. For instance, the absence of vinyl groups results in improved heat resistance, while the remaining essentially unaffected unsaturation in the backbone results in good processability and good elastomeric properties at low temperature.

In U.S. Pat. No. 3,700,748 block polymers are provided having substantially improved capability of forming stable elastomeric polar derivatives, these block polymers being prepared by block polymerizing a monovinyl arene with butadiene, the butadiene block containing between about 8 and 80 percent 1,2-structure and thereafter selectively hydrogenating (in the presence of a nickel based catalyst) so as to substantially eliminate the unsaturation in the pendant vinyl groups. This process, however, is not very selective since it results in hydrogenating butadiene blocks having 1,2-structure, as well as those having a 1,4-structure.

U.S. Pat. No. 3,663,635, DE 3401983, U.S. Pat. No. 5,039,755, U.S. Pat. No. 5,132,372, EP 339986, EP 434469, EP 544304, EP 795564, EP 810231, and WO 9525130 described catalyst systems that are suitable for the hydrogenation of conjugated diene (co)polymers. These catalyst systems are prepared by reacting a titanocene or similar group 4 metallocene (i.e., a ferrocene-like molecule based on a group 4 metal and 2 $\eta^5$ ligands), with a metal hydride or an organometallic compound and contacting (activating) the resulting catalyst mixture with hydrogen. These catalyst systems have a very high hydrogenation activity, but none are known to be capable of selectively hydrogenating said conjugated diene (co)polymers into partially hydrogenated (co)polymers.

In a paper, entitled "Metallocenes: homogeneous catalysts for elastomer hydrogenation", the authors M. D. Parellada, J. A. Barrio, J. A. Delgado (Rev. R. Aced. Cienc. Exactas, Fis. Nat. Madrid (1993), 87(1), 127–9) describe the advantages of a metallocene type catalyst for hydrogenating styrenic block copolymers over Ziegler type hydrogenation catalysts. It is said that replacement of a cyclopentadienyl (Cp) ring by a pentamethylcyclopentadienyl (Cp*) ring in these titanium complexes brings about greater stability and more selectivity, first hydrogenating vinyl bonds rather than the olefin bonds within the copolymers. A suitable process for the preparation of partially hydrogenated polymers is, however, not disclosed.

EP 545844 describes a process for partial hydrogenation of a styrenic block copolymer in the presence of Cp*CpTiX2 and n-butyl lithium. Although all or nearly all of the 1,2-polybutadiene is hydrogenated, so is also a major portion of the 1,4-polybutadiene (cf. Examples 12 to 15). This application rather illustrates the difficulty of obtaining highly selective, partially hydrogenated polymers wherein the 1,2-butadiene recurring units are hydrogenated, but the 1,4-butadiene recurring units are not hydrogenated.

EP 584860 describes a process for partial hydrogenation of conjugated diene polymers, that selectively hydrogenates butadiene units, but not (or less so) isoprene units. This process too is not very selective as regards hydrogenating butadiene blocks having 1,2-structure, respectively 3,4-structure (in case of isoprene) only.

In JP 04096904 Asahi describes a method for hydrogenating olefin compounds, using a titanium-, zirconium- or hafnium-based metallocene compound as hydrogenation catalyst and in the presence of a reducing compound. For instance, this application describes the hydrogenation of 7 different (block) copolymers with $Cp^*{}_2TiCl_2$ and dibutyl magnesium or n-butyl lithium as catalyst. Hydrogenation in each instance was nearly complete; preparation of the aforementioned partially hydrogenated conjugated diene polymers is not described.

In EP 302505 Asahi describes partially hydrogenated butadiene polymers or partially hydrogenated random butadiene/styrene copolymers and a process for preparing the same. However, although "any catalysts and any production methods may be utilized" (page 5, line 8), the specification also indicates that "the selective partial hydrogenation of the present invention must be practiced under extremely mild reaction conditions . . . " (page 5, lines 12–13). It would therefore appear that the preparation of partially hydrogenated conjugated diene polymers requires rigid control of the reaction conditions. Besides, the hydrogenation illustrated in this patent is not selective to the 1,2-conjugated diene recurring unit: without even being close to complete hydrogenation of the "vinyl-linkage moiety [B]", hydrogenation of the "whole butadiene portion [A]" is already greater than the "vinyl-linkage content [V]" (cf. Table 1 of this patent), whereas if the "vinyl-linkage moiety [B]" is completely hydrogenated, than also the 1,4-linkage content is substantially reduced (cf. Tables 5 to 8 of this patent).

In JP 09-291121, Asahi describes an improvement on said process, thus producing a partially hydrogenated butadiene polymer with selective hydrogenation of the 1,2-diene recurring units. According to this application, at least 90% of the 1,2-diene recurring units must be hydrogenated, with a catalyst having an r1/r2 ratio greater than 5, wherein 'r1' corresponds with the reaction rate for the hydrogenation of the 1,2-diene recurring units and wherein 'r2', at identical reaction conditions, corresponds with the reaction rate for the hydrogenation of the 1,4-diene recurring units. A compound comprising titanium ligated by a substituted metallocene is provided as an example of a suitable hydrogenation catalyst. However, stringent control of the hydrogenation reaction still appears to be necessary, to avoid the hydrogenation of the 1,4-diene recurring units.

In U.S. Pat. No. 5,925,717 the hydrogenation of hydrogen terminated SBS block copolymers is disclosed, in the presence of optionally substituted titanium indenyl and/or bis indenyl compounds as catalyst. Such catalysts are said to be equally active to 1,4-conjugated diene recurring units as 1,2-conjugated diene recurring units (column 6, lines 52–58).

It is therefore an object of the present invention to provide an attractive process, that does not require rigid control of the reaction conditions, to prepare the partially hydrogenated conjugated diene polymers described herein before.

BRIEF SUMMARY OF THE INVENTION

Accordingly, the invention provides a process for preparing a partially hydrogenated butadiene polymer comprising no more than 3 mol % 1,2-butadiene recurring units (A) and no more than 3 mol % ethylene recurring units (D), calculated on the total content mol/mol of recurring units, wherein a butadiene polymer comprising 1,2-butadiene recurring units (A) and 1,4-butadiene recurring units (B) is hydrogenated in the presence of hydrogen and a titanium-, zirconium- and/or hafnium-based metallocene compound as hydrogenation catalyst and a cocatalyst, characterized in that:

a) the hydrogenation catalyst has a reaction rate ratio of r1/r2 greater than 5, preferably greater than 15, wherein r1 and r2 are the hydrogenation rates of recurring units (A) and (B) respectively at the same reaction conditions, b) the cocatalyst is an alkali metal hydride, added as such or prepared in situ, and c) hydrogenation of the conjugated diene is carried out until at least 97% of recurring units (A) have been hydrogenated.

DETAILED DESCRIPTION OF THE INVENTION

The group 4 metallocene may be similar to the metallocenes mentioned in documents mentioned above. Such compounds may be represented by the following general formula:

$$L_2MX_2$$

wherein M represents a metal chosen from Ti, Zr and Hf; each X independently is selected from hydrogen, $C_1$–$C_{12}$ hydrocarbon groups, $C_1$–$C_{12}$ hydrocarbonoxy groups, $C_1$–$C_{12}$ hydrocarbonylsilyl groups, halogen groups and carbonyl groups; and each L independently is selected from a cyclopentadienyl group, an indenyl group or a 5-membered heterocyclic group, each bearing at least one substituent, wherein the substituent is selected or the substituents are each independently selected from $C_1$–$C_{12}$ hydrocarbon groups, $C_1$–$C_{12}$ hydrocarbonoxy groups, halogen groups and carbonyl groups, and bulky substituents containing one or more heteroatoms such as $C_1$–$C_{12}$ hydrocarbonylsilyl groups, a $C_4$–$C_{10}$ dihydrocarbylamino group.

Each ligand L may be part of a fused ring system, i.e., an indenyl or fluorenyl group, as disclosed in EP 795564, EP 830895 and U.S. Pat. No. 3,663,635 herewith incorporated by reference.

Each ligand L may (also) be a heterocyclic ring system, i.e., a phospholyl group, as disclosed in EP 810213 herewith incorporated by reference.

Both ligands L may (also) be linked together, i.e., by a dialkylsilyl group, as disclosed in EP 545844, herewith incorporated by reference.

Suitable substituents, whereby groups L are substituted, include halogen atoms, hydrocarbyl groups optionally containing heteroatoms of up to 12 carbon atoms. Such heteroatoms include nitrogen, oxygen, phosphorus, silicon and the halogens.

Preferred substituents are $C_1$–$C_6$ alkyl groups, $C_1$–$C_6$ alkoxy groups, $C_6$–$C_{10}$ aryl groups, $C_6$–$C_{10}$ aryloxy groups, bis($C_1$–$C_4$ alkyl)silyl groups and tris($C_1$–$C_4$ alkyl)silyl groups and chlorine atoms.

The number of substituents may be easily determined by empirical methods. For instance, in case of a metallocene comprising two substituted indenyl or fluorenyl groups, a single substituent (at the 1-, 2-, or 3-position) will normally suffice to cause a r1/r2 ratio that is greater than 5. Suitable examples of mono-substituted indenyls include: methyl-; isopropyl-; tert-butyl-; phenyl-; chloro-; bismethylsilyl; bis-ethylamino-; pentaflurorphenyl-; and bis(n-butyl)phosphinoindenyl (either in the 1- or 2-position), and the like. Suitable examples of the disubstituted indenyls include 1,2-dimethyl-; 1,3-dimethyl-; 1-methyl,2-ethyl-; and 1-methyl,2-chloroindenyl and similar compounds. Indeed, a titanium metallocene comprising two 1-trimethylsilylindenyl groups has a r1/r2 ratio of greater than 15, i.e. about 22 (determined at $^1$H NMR analysis of reaction products made at 70° C. and 30 kg/cm$^2$ hydrogen), which is in the preferred range. In case of a substituted phosphoryl group, generally at least two substituents will be required. Finally, in case of a substituted cyclopentadienyl group, generally at least 3 substituents will be required, preferably at the 1-, 2-, and 4-positions. Examples of suitable substituted cyclopentadienyl groups include 1,2,4-trimethyl-; 1,2,4-tris(tert-butyl)-; tetramethyl-; and pentamethylcyclopentadienyl. Use of pentamethylcyclopentadienyl as ligand will result in a metallocene having a r1/r2 ratio of about 230. If the substituents themselves are very bulky, then even less substituents may be sufficient.

Examples of preferred ligands hence include: pentamethylcyclopentadienyl, 1-trimethylsilylindenyl, 2-methylindenyl; 1,2-dimethylindenyl; 2-phenylindenyl; 1,3-dimethylindenyl; 1,3-di(tert-butyl)indenyl; 2-tert-butylindenyl; and 1,2,3-trimethylindenyl and the like.

The expressions hydrocarbyl and hydrocarboxyl used above include alkyl and alkoxy groups (cyclic, linear or branched); aryl and aryloxy groups and substituted variants thereof.

Preferably each X is a halogen atom, more preferably a chloride atom. Therefore, the most preferred group 4 metallocene is bis(pentamethylcyclopentadienyl)titanium dichloride (Cp*$_2$TiCl$_2$).

The metallocene is used in amounts of from 0.001 to 10, typically from 0.005 to 50 mmol per 100 g of unsaturated compound, and preferably in amounts in the range of from 0.01 to 1 mmol/100 g. More may be used to speed up the hydrogenation process, but also—given the great activity of the catalyst system—less may be used, to reduce the cost and environmental impact of the catalyst system.

The more common alkali metal hydride used as cocatalyst is lithium hydride, as lithium compounds are frequently used as polymerization initiators. The lithium hydride may be added as is, but also be made in situ by termination of the living polymer (noticeable by the disappearance of the typical orange color) or by reaction of an added lithium alkyl with hydrogen. The preparation of the lithium hydride by termination of the living polymer is preferred. However the cocatalyst may also be a sodium or potassium hydride.

The initial molar ratio of cocatalyst over the metallocene hydrogenation catalyst may vary widely. Thus, this molar ratio may vary from 2 to 100, for instance from 4 to 50.

It is the merit of the present invention that the hydrogenation reaction is relatively straightforward and uncomplicated. For instance, in the preferred embodiment a cement containing living polymer is terminated by addition of hydrogen and vigorous stirring until the typical color of living polymer has disappeared. The metallocene is either dissolved in a suitable, inert solvent to which subsequently the cocatalyst is added or vice versa. No specific pressure and temperature conditions apply. For instance, the metallocene and cocatalyst may be reacted by contacting these components for about 1 to 60 minutes, preferably for 5 to 20 minutes at a temperature in the range of 20–90° C. and at a pressure in the range of 0.0 to 51 kg/cm².

The catalysts of this invention can be used to hydrogenate the double bonds of butadiene polymers, and copolymers. In particular, they may be used for the selective hydrogenation of such polymers and copolymers of medium molecular weight, i.e. having a weight average molecular weight in the range from 500 to 1,000,000. Copolymers of particular interest are copolymers of 1,3-butadiene and another conjugated diene and/or a vinylaromatic compound such as styrene or alpha-methylstyrene and/or an acrylic compound such as alkyl acrylate or alkyl methacrylate. Among these copolymers are included random copolymers in which the comonomers are randomly distributed along the polymer chain, cross-linked copolymers and pure or gradual block copolymers.

The block copolymers are especially interesting since some of them are thermoplastic elastomers usable from the industrial point of view. Such block copolymers consist of:

(a) at least one polymer block predominantly made of one or more vinylaromatic compounds; and (b) at least one polymer block predominantly made of butadiene. The expression "predominantly" in this respect means for at least 80 mol %. Among these block copolymers are included linear and branched and radial and star copolymers. Another group of interesting block copolymers includes polymers consisting of at least one polymer block predominantly made of butadiene, and at least one polymer block predominantly made of one or more conjugated dienes other than butadiene. The block copolymers used preferably in this invention are the so-called styrenic block copolymers that contain between 10 to 90 wt. % of vinylaromatic compounds. The preferred copolymers are those which contain approximately 25 to 80 percent of 1,2-vinylic bonds in the butadiene block.

The butadiene polymers and copolymers that can be hydrogenated according to this invention can be obtained by known polymerization methods such as anionic polymerization, cationic polymerization, coordination polymerization, or radical polymerization, etc. The anionic polymerization is especially interesting in producing polymers and copolymers that can be hydrogenated according to the invention. Among the initiators that can be used, the organolithium compounds are preferred, particularly a butyllithium compound.

Hydrogenation is preferably carried out in solution in an inert hydrocarbon, preferably the same hydrocarbon solvent employed during polymerization. The term "inert solvent" means an organic solvent that does not react with any of the reactants that participate in the reaction. Examples of these inert solvents that are recommended inside the frame of this invention are the aliphatic hydrocarbons and cycloaliphatic hydrocarbons such as n-hexane, n-oxtance, isooctane, cyclohexane, methylcyclopentane, cyclopentane, ethers such as tetrahydrofurane, aromatic hydrocarbons such as benzene, toluene, xylene that are not hydrogenated in the selected reaction conditions, and mixtures of these compounds.

Conventional hydrogenation conditions may be applied. For instance, suitable hydrogen pressures are between 1 and 70 kg/cm², preferably between 5 and 50 kg/cm². Suitable reaction temperatures vary from 20 to 150° C., preferably between 50 and 120° C. Ideally, the conditions are selected such as to approach near full conversion of the recurring units (A) (i.e., better than 97%, preferably better than 98%, more preferably better than 99%) with hardly any conversion of the recurring units (B) (i.e., no more than 3%, preferably no more than 2%, more preferably no more than 1%).

The product resulting from this selective hydrogenation may be examined by $^1$H NMR to determine the presence or absence of any vinyl groups. In the usual $^1$H NMR analysis, any 1,4-structure will show a chemical shift between 5.15 and 5.46 ppm. The 1,2-structure shows two shifts namely between 4.75 and 5.10 ppm and between 5.46 and 5.73 ppm. It is desirable in the final product that substantially no signal is observed within the latter two chemical shift regions in the $^1$H NMR spectrum.

The hydrogenation products may be easily isolated from the solvent through known processes such as distillation, precipitation, etc.

The invention will now be illustrated by means of the following examples.

Polymer Preparation

A polystyrene-polybutadiene-polystyrene block copolymer (Polymer A) of medium vinyl content and having an apparent molecular weight of 100,000 (as measured with gel chromatography (GPC) using polystyrene calibration standards) was prepared in a stainless steel reactor by sequential anionic polymerization using sec-butyllithium as the initiator. The polymerization was conducted in cyclohexane, to which had been added 150 ppm of diethoxypropane (DEP). At the end of the polymerization reaction the reactor was sparged with hydrogen to terminate the living SBS-Li polymer and produce a cement comprising the aforementioned polymer (SBS) and LiH.

In a similar fashion cements comprising high vinyl polymers Polymer B and D were made (using, however, 300 ppm of DEP). Using the process of Polymer A also a cement comprising a higher molecular weight polymer, Polymer C, was made. Polymer E was made analogous to Polymer A. The results are in Table 1.

EXAMPLE 1

Selective hydrogenation of medium vinyl SBS block copolymer with bis(pentamethylcyclopentadienyl)titanium dichloride (Cp*$_2$TiCl$_2$).

A stainless steel reactor was charged with 800 grams of cement, comprising polymer A. The temperature of the reactor was set to 70° C. and the reactor was pressurized to 10 kg/cm² of hydrogen to saturate the cement. Meanwhile a suspension of 45 mg (0.12 mmol) of Cp*$_2$TiCl$_2$ in 1.0 ml of cyclohexane was prepared. The catalyst suspension was added to the reactor and hydrogen pressure was raised to 30 kg/cm². The hydrogenation was allowed to proceed for 2 hours, during which period samples were drawn from the reactor and analyzed by $^1$H NMR to determine the conversion of the olefinic double bonds. Results are shown in Table 2.

EXAMPLES 2–5

In a manner similar to Example 1, cements containing Polymers B–E were selective hydrogenated. In Examples 2, 3 and 5–9, the temperature was set to 90° C., whereas in Example 4, the temperature was set to 120° C. The amount of catalyst varied from 45 mg (0.12 mmol) Cp*$_2$TiCl$_2$ (Example 2); 52 mg (0.14 mmol) Cp*$_2$TiCl$_2$ (Example 3); 60 mg (0.16 mmol) Cp*$_2$TiCl$_2$ (Example 4); 31 mg (0.06 mmol) bis(1-trimethylsilylindenyl)TiCl$_2$ (Example 5); 34 mg (0.09 mmol) bis(2-methylindenyl)TiCl$_2$ (Example 6); 67 mg (0.17 mmol) bis(1,2-dimethylindenyl)TiCl$_2$ (Example 7); ); 66 mg (0.13 mmol) bis(2-phenylindenyl)TiCl$_2$ (Example 8); 67 mg (0.17 mmol) bis(1,3-dimethylindenyl)TiCl$_2$ (Example 9). In Examples 5, 7 and 8, the reaction was allowed to proceed for 1 hour instead of 2 hours. These results are also included in Table 2.

COMPARATIVE EXAMPLE 1

In a manner identical to Example 1, but for the use of a suspension of 39 mg (0.11 mmol) of bis(indenyl)titanium dichloride in 10 ml of cyclohexane, Polymer A was selectively hydrogenated. This metallocene has a r1/r2 ratio of 2. The hydrogenation was allowed to proceed for 1 hour. The results are shown in Table 3.

COMPARATIVE EXAMPLE 2

In a similar manner to Example 1, conducted at 90° C. a cement comprising Polymer D was hydrogenated using a suspension of 40 mg (0.15 mmol) of bis(methylcyclopentadienyl)titanium dichloride in 10 ml of cyclohexane. This metallocene has a r1/r2 ratio of 3. The hydrogenation was allowed to proceed for 1 hour. The results are shown in Table 3.

REFERENCE EXAMPLE 1

In Examples 20 to 22 and Comparative Examples 1 and 2 of JP 04-096904, an SBS block copolymer, terminated with methanol, is hydrogenated under conditions similar to Example 1 using Cp*$_2$Ti(phenyl)$_2$ or Cp*$_2$Ti(tOlyl)$_2$ either or not in the presence of a cocatalyst. Under all circumstances, whether mild or sever, more than the 1,2-vinyl bond content was hydrogenated.

CONCLUSION

The object of the present invention, providing a process that will lead to a partially hydrogenated butadiene polymer comprising no more than 3 mol % 1,2-butadiene recurring units (A) and no more than 3 mol % ethylene recurring units (D), calculated on the total content mol/mol of recurring units, is achieved by the examples according to the invention. If the reaction rate ratio is not high enough, as in comparative examples 1 and 2, then—despite the presence of lithium hydride—the selectivity is inadequate. On the other hand, the prior art abundantly illustrates that merely using titanium-based substituted metallocene compounds as hydrogenation catalyst neither does the trick.

TABLE 1

Polymer preparation

| Polymer | Styrene content (% wt.) | Vinyl content (% wt.) | Solids content (% wt.) | [LiH] (mmol/L) |
|---|---|---|---|---|
| A | 30 | 41 | 14 | 1.7 |
| B | 29 | 69 | 14 | 1.7 |
| C | 28 | 8 | 8 | 0.8 |
| D | 30 | 65 | 18.5 | 2.3 |
| E | 30 | 45 | 13.2 | 1.6 |

TABLE 2

| Example No. | Polymer | [cat] (mmol/100 g) | LiH/Ti | 1,2-vinyl mol % | butylene mol % | 1,4-butadiene mol % | polyethylene mol % |
|---|---|---|---|---|---|---|---|
| 1 | A | 0.11 | 14 | 0 | 41 | 58 | 1 |
| 2 | A | 0.11 | 14 | 0 | 41 | 58 | 1 |
| 3 | B | 0.13 | 12 | 0 | 69 | 30 | 1 |
| 4 | C | 0.25 | 5 | 0 | 8 | 91 | 1 |
| 5 | D | 0.04 | 38 | 0 | 65 | 32 | 3 |
| 6 | E | 0.10 | 18 | 1 | 44 | 54 | 1 |
| 7 | E | 0.18 | 10 | 0 | 45 | 53 | 2 |
| 8 | E | 0.14 | 12 | 0 | 45 | 51 | 4 |
| 9 | E | 0.18 | 10 | 1 | 44 | 54 | 1 |

TABLE 3

| Example No. | Polymer | [cat] (mmol/100 g) | LiH/Ti | 1,2-vinyl mol % | butylene mol % | 1,4-butadiene mol % | polyethylene mol % |
|---|---|---|---|---|---|---|---|
| C 1 | A | 0.10 | 15 | 0 | 41 | 19 | 40 |
| C 2 | D | 0.10 | 15 | 5 | 60 | 13 | 22 |

The invention claimed is:

1. A process for preparing a partially hydrogenated block copolymer having at least one partially hydrogenated polybutadiene block, the entire block copolymer comprising no more than 3 mol % 1,2-butadiene recurring units (A) and no more than 3 mol % ethylene recurring units (D), calculated on the total content mol/mol of recurring units, wherein a block copolymer comprising 1,2-butadiene recurring units (A) and 1,4-butadiene recurring units (B) is hydrogenated in the presence of hydrogen, a metal based metallocene compound as hydrogenation catalyst represented by the general formula:

$$L_2MX_2$$

wherein M represents the metal selected from the group consisting of titanium, zirconium and hafniu; each X independently is selected from hydrogen, $C_1$–$C_{12}$ hydrocarbon groups, $C_1$–$C_{12}$ hydrocarbonoxy groups, $C_1$–$C_{12}$ hydrocarbonylsilyl groups, halogens and carbonyl groups; and wherein each L is selected from the group consisting of pentamethylcyclopentadienyl, 1-trimethylsilylindenyl, 2-methylindenyl; 1,2-dimethylindenyl; 2-phenylindenyl; 1,3-dimethylindenyl; 1,3-di(tert-butyl)indenyl; 2-tertbutyl-indenyl; and 1,2,3-trimethylindenyl, and a cocatalyst, wherein the hydrogenation catalyst has a reaction rate ratio of r1/r2 greater than 5, wherein r1 and r2 are the hydrogenation rates of recurring units (A) and (B) respectively at the same reaction conditions, the cocatalyst is an alkali metal hydride, and hydrogenation of the butadiene is carried out until at least 97% of recurring units (A) have been hydrogenated.

2. The process of claim 1 wherein the partially hydrogenated block copolymer has at least two styrene end blocks and at least one hydrogenated polybutadiene midblock.

3. The process of claim 2 wherein the partially hydrogenated block copolymer is a polystyrene-partially hydrogenated polybutadiene-polystyrene linear block copolymer.

4. The process of claim 1 wherein the block copolymer comprises from 10 to 90 wt. % of vinyl aromatic compounds prior to hydrogenation.

5. The process of claim 1 wherein the polybutadiene block comprises from about 25 to about 80% of the 1,2-structure.

6. The process of claim 1, wherein the alkali metal hydride is lithium hydride.

7. The process of claim 1, wherein the initial molar ratio of cocatalyst to hydrogenation catalyst is between 2 and 100.

8. The process of claim 8, wherein M is titanium.

9. The process of claim 1 wherein the hydrogenation is conducted at a hydrogenation pressure between 1 and 70 kg/cm2 and a reaction temperature of between 20 and 150° C.

* * * * *

UNITED STATES PATENT AND TRADEMARK OFFICE
CERTIFICATE OF CORRECTION

| | |
|---|---|
| PATENT NO. | : 7,186,783 B2 |
| APPLICATION NO. | : 10/110921 |
| DATED | : March 6, 2007 |
| INVENTOR(S) | : De Jong |

It is certified that error appears in the above-identified patent and that said Letters Patent is hereby corrected as shown below:

Column 8, claim 1, line 62, delete "hafniu" and insert --hafnium--.

Signed and Sealed this

Fifteenth Day of May, 2007

JON W. DUDAS
*Director of the United States Patent and Trademark Office*